May 12, 1953  J. L. AMOS ET AL  2,638,465
COPOLYMERS OF STYRENE AND ALPHA-METHYL STYRENE
AND PROCESS FOR MAKING THE SAME
Filed Jan. 3, 1950
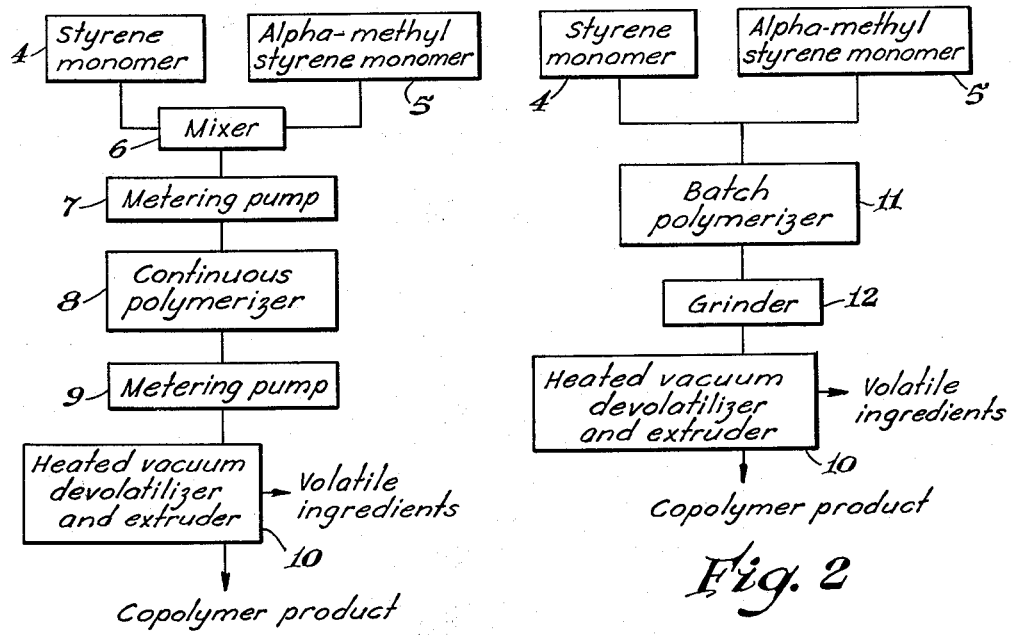
Fig. 1
Fig. 2
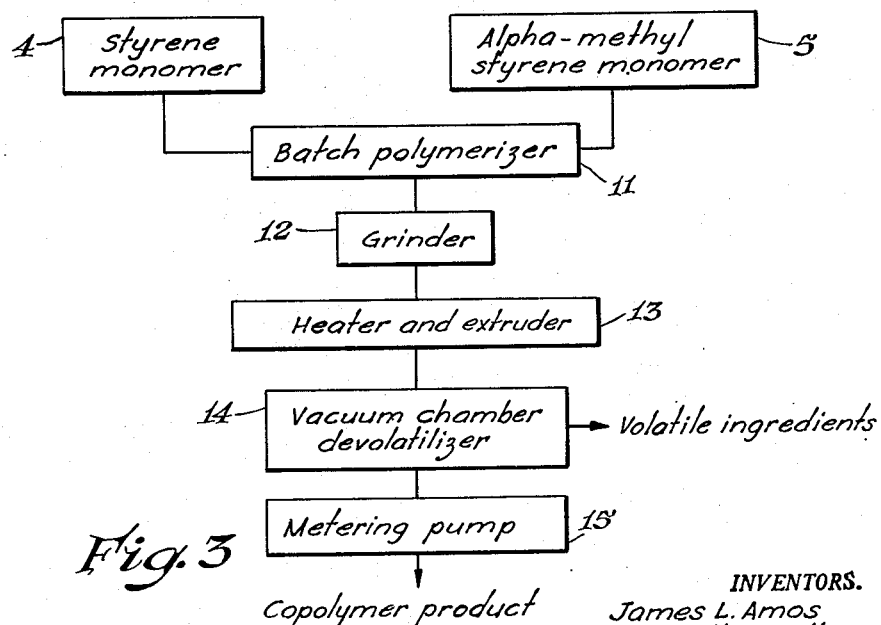
Fig. 3
INVENTORS.
James L. Amos
Carroll T. Miller
BY
Griswold & Burdick
ATTORNEYS Patented May 12, 1953

2,638,465

UNITED STATES PATENT OFFICE 2,638,465

COPOLYMERS OF STYRENE AND ALPHA-METHYL STYRENE AND PROCESS FOR MAKING THE SAME

James L. Amos and Carroll T. Miller, Midland, Mich., assignors to The Dow Chemical Company, Midland, Mich., a corporation of Delaware Application January 3, 1950, Serial No. 136,584

4 Claims. (Cl. 260—88.1)

This invention concerns an improved process for making solid copolymers of styrene and alpha-methyl styrene which copolymers possess greater dimensional stability to heat, i. e. withstand higher temperatures without becoming distorted, than polystyrene which has been prepared under similar polymerization conditions. It relates more particularly to solid copolymers of styrene and alpha-methyl styrene which are characterized by having a higher heat distortion temperature than polystyrene of similar molecular weight and which contain less than one per cent by weight of methanol soluble substances.

It is known to prepare thermoplastic resins by polymerizing styrene with alpha-methyl styrene and to recover the copolymer product in purified form by distilling off unreacted monomers together with other volatile ingredients, e. g. dimers or trimers of the monomeric compounds.

We have observed that the copolymers of styrene and alpha-methyl styrene vary widely in properties such as dimensional stability to heat, tensile strength, impact, or per cent soluble in methyl alcohol, depending in part upon the polymerizing conditions, i. e. the manner in which the polymerization reaction is carried out, and also upon the conditions of temperature and time to which the copolymer is subjected during purification of the same by distilling off volatile ingredients.

The copolymers of styrene and alpha-methyl styrene prepared by polymerization methods usually employed to polymerize styrene, e. g. by polymerization in bulk, frequently contain from 2 to 5 per cent by weight, or more, of substances formed as by-products of the polymerization reaction, which by-product substances are soluble in methanol, but cannot readily be separated from the copolymer by usual manner, e. g. by vaporizing in vacuum.

It has been observed that the formation of the non-volatile methanol soluble substances usually occurs when a mixture of styrene and alpha-methyl styrene is polymerized in bulk by heating the same to a polymerization temperature such that the copolymer obtained forms a 10 weight per cent solution in toluene having an absolute viscosity of less than about 15 centipoises at 25° C. The non-volatile methanol soluble substances are also formed when the mixture of polymerizable starting materials is polymerized to 80–90 per cent completion at a temperature such that the copolymer thus produced forms a 10 weight per cent solution in toluene having an absolute viscosity of 20 centipoises, or greater, but the polymerization is finished off, or substantially completed, by heating the mixture to a higher temperature which forms a copolymer of the remaining monomers having an absolute viscosity in toluene of about 15 centipoises, or less, at 25° C.

It has also been noted that the formation of the non-volatile methanol soluble substances occurs when a solid high copolymer of styrene and alpha-methyl styrene is heated at temperatures above its melting point for prolonged periods of time, particularly at temperatures such as are required to rapidly vaporize volatile ingredients therefrom in vacuum.

The non-volatile methanol soluble by-product substances are believed to be composed principally of polymers, or copolymers of relatively low molecular weight. Regardless of the composition of the non-volatile methanol soluble substances, the presence of more than about one per cent by weight of such methanol soluble by-product substances in admixture with the copolymer lowers the heat distortion temperature of the copolymer by an undesirable amount. Such polymeric products of alpha-methyl styrene and styrene usually possess inferior properties, particularly with regard to dimensional stability to heat.

It is therefore a primary object of the invention to provide a process for making solid high copolymers of styrene and alpha-methyl styrene which copolymers possess greater dimensional stability to heat than polystyrene of similar molecular weight. Another object is to prepare copolymers of styrene and alpha-methyl styrene which copolymers can readily be molded in usual ways to form articles having dimensional stability at temperatures corresponding to the atmospheric boiling point of water. A further object is to prepare copolymers of styrene and alpha-methyl styrene by procedure which avoids, or at least restricts greatly, the formation of non-volatile methanol soluble by-product substances during the polymerization reaction. A still further object is to provide a process for making improved copolymers of styrene and alpha-methyl styrene by procedure which involves polymerizing a mixture of styrene and alpha-methyl styrene to form a polymeric product substantially free of non-volatile methanol soluble substances and thereafter separating volatile ingredients from the copolymer by procedure which avoids decomposition of the copolymer to form non-volatile methanol soluble substances. Other and related objects will become apparent from the following description of the invention.

According to the invention, copolymers of styrene and alpha-methyl styrene which are superior to polystyrene, particularly as regards dimensional stability to heat can be prepared by procedure which involves heating a mixture of the polymerizable materials in bulk, i. e. in the substantial absence of inert liquid media, to a temperature below that at which methanol soluble substances are formed, and thereafter vaporizing volatile ingredients from the product by heating the latter under vacuum to a temperature above the melting point of the copolymer, for a time less than is required to cause decomposition of the same at the temperature employed, removing the vapors from contact with the copolymer and cooling the devolatized copolymer.

The invention may be further explained with reference to the accompanying drawing, in which Fig. 1 is a flow diagram illustrating a procedure for the production of a copolymer of styrene and alpha-methyl styrene in continuous manner by polymerizing a mixture of the monomers to obtain a fluid solution of the copolymer in monomers, e. g. a solution containing 30 per cent by weight or more of copolymer, and thereafter separating the volatile ingredients from the copolymer;

Fig. 2 is a flow diagram illustrating a procedure for production of the copolymer by maintaining a mixture of styrene and alpha-methyl styrene in bulk at a polymerization temperature until nearly all of the monomers are polymerized, i. e. until a solid resin is obtained, and thereafter devolatilizing the copolymer, and Fig. 3 is a similar diagram illustrating another method of separating the volatile ingredients from the copolymer.

In the procedure of Fig. 1, the styrene 4 and the alpha-methyl styrene 5 are charged in the desired proportions into a mixer 6, such as a tank provided with a propeller agitator and stirred together to produce a uniform liquid mixture. The mixture of monomers is fed in continuous manner by a metering pump 7 into a polymerizer 8 which may conveniently be a closed vessel provided with heating or cooling coils, a stirrer and suitable inlets and outlets for feed of the monomers thereto and discharge of the copolymer solution. The copolymer solution is withdrawn from the polymerizer 8 by a metering pump 9 and is fed into a heated vacuum devolatilizer and extruder 10, adapted for continuously forwarding and discharge of the copolymer by extrusion while separating volatile ingredients therefrom.

In the devolatilizing system 10, which is maintained at a temperature at which the polymeric product is freely fluid, the unreacted monomers together with other volatile ingredients are vaporized while the copolymer is mechanically worked or agitated in vacuum by a kneading or stirring action to provide a changing surface for escape of the volatile ingredients from the fluid copolymer. The devolatilized copolymer is then forced through an extrusion orifice and is drawn away and cooled to solid form. Vapors of the unreacted monomers together with other volatile ingredients are separately withdrawn from the system 10 through a suitable outlet connected to a vacuum pump, with a recovery unit therebetween for condensing liquid substances. An apparatus suitable for use as the devolatilizer and extruder 10 is described in U. S. Patent 2,488,189.

The procedure of Fig. 2 is useful in separating volatile ingredients from the copolymer, when a mixture of styrene and alpha-methyl styrene is polymerized in bulk until a solid resin which can be ground or crushed to a non-tacky granular form is obtained. In the system, a mixture of styrene 4 and alpha-methyl styrene 5, in the desired proportions, is polymerized to form a solid log or billet of a size suitable for convenient handling. Such billets may be obtained by sealing the mixture of monomers in a sheet metal container, e. g. a tin lined 5 or 10 gallon sheet metal can, and submerging the can in a liquid bath or batch polymerizer 11, maintained at a desired polymerization temperature. The polymerization reaction is continued until nearly all of the monomers are polymerized, i. e. until 95 per cent or more of the monomers are polymerized. Thereafter, the can is stripped from the solid resin and the latter is ground or crushed to a granular form by a suitable grinder 12. The granular polymeric product is then fed into a heated vacuum devolatilizer and extruder 10 and the volatile ingredients separated from the copolymer as heretofore described.

The procedure of Fig. 3 illustrates another method of separating volatile ingredients from the copolymer when the polymeric product is obtained in solid form. In the system, the polymerization and grinding of the solid polymeric product to a granular form are accomplished by procedure similar to that described with reference to Fig. 2. The granular polymeric product is fed into a suitable heater and extruder 13, where it is rapidly heated to a temperature above its melting point, e. g. a temperature of from 200° to 280° C., preferably to a temperature between 240° and 280° C. The heat-fluidized polymeric product is fed by pressure of the extruder into an upper portion of a vacuum chamber devolatilizer 14, wherein it is formed into thin streams, or strands, which are permitted to flow, or fall, for a material distance out of contact with inner walls of said chamber through a zone of reduced pressure to vaporize volatile ingredients from the copolymer. The strands of fluid plastic coalesce to form a fluid mass of copolymer in a lower portion of the chamber 14. The copolymer is withdrawn from chamber 14 by metering pump 15 and cooled to solid form. Vapors of the volatile ingredients are separately withdrawn from the vacuum chamber through an outlet connected to a suitable vacuum pump, not shown. The vacuum chamber devolatilizer 14 may conveniently be an arrangement of apparatus such as that described in U. S. Patent 2,146,532.

The proportions of alpha-methyl styrene and styrene employed in making the copolymer usually correspond to from 10 to 50 per cent by weight of alpha-methyl styrene and from 90 to 50 per cent of styrene. In a preferred embodiment of the invention, the alpha-methyl styrene is employed in amounts corresponding to from 15 to 40 per cent by weight of the combined weight of the polymerizable starting materials.

It is important that the mixture of styrene and alpha-methyl styrene be polymerized under temperature conditions which avoid, or at least restrict greatly, the tendency toward the formation of non-volatile methanol soluble substances. In this connection, the mixture of monomers should be polymerized at a temperature not greater than that required to form a normally solid copolymer having an average molecular weight such that a solution consisting of 10 per cent by weight of the copolymer in tolene has an absolute viscosity of at least 18 at 25° C. The approximate maximum polymerization temperature to be employed for any mixture of styrene and alpha-methyl styrene within the range of proportions herein stated can be determined from the empirical equation:

$$t = 147 - 0.78x$$

wherein $t$ represents temperature in degrees centigrade and $x$ is the per cent by weight of alpha-methyl styrene in the mixture of polymerizable starting materials. The copolymer product prepared at such polymerization temperature usually contains less than 1 per cent by weight of non-volatile methanol soluble substances. The copolymer also has a molecular weight such that a solution consisting of 10 per cent by weight of the same in toluene has an absolute viscosity of about 20 at 25° C. A lower polymerization temperature than that defined by the equation will, of course, produce a copolymer of higher molecular weight. The polymerization reaction is preferably carried out at a temperature between 70° C. and a temperature defined by the aforementioned equation.

The polymerization reaction may be accomplished in the absence of catalysts, but is advantageously carried out by adding to the mixture of polymerizable starting materials a small amount, e. g. from 0.01 to 3 per cent by weight, of a polymerization catalyst such as benzoyl peroxide, lauroyl peroxide, tertiary-butyl hydroperoxide, di-tertiary-butyl peroxide, or tertiary-butyl per-benzoate. The use of a catalyst permits the monomers to be more completely polymerized, and at a faster rate of polymerization, than is possible in the absence of a catalyst, under similar polymerization conditions. In this connection, the tertiary per-oxygen compounds such as tertiary-butyl hydroperoxide and di-tertiary-butyl peroxide are particularly effective polymerization catalysts.

In preparing the copolymers, the styrene and alpha-methyl styrene are mixed together in the desired proportions and the mixture is heated in bulk to a polymerization temperature between 70° C. and a temperature defined by the aforementioned equation, until the desired amount of the monomers are polymerized. The polymerization reaction is usually discontinued when from 50 to 80 per cent of the monomeric starting materials are polymerized to form a viscous fluid solution of the copolymer in the monomers. The polymerization reaction may be continued until the body of material is a hard solid resin which can readily be crushed, or broken, to form a non-tacky granular product at room temperature. The mixture of styrene and alpha-methyl styrene may also be heated in bulk to a polymerization temperature within the range just stated until about 95 per cent of the monomeric materials are polymerized, i. e. until a solid resin body which can be broken with a clean fracture to form a non-tacky granular product is obtained, and the polmerization finished off, or completed, by heating the body of plastic to a temperature between 140° and 150° C., without the formation of more than a minor and inconsequential amount of non-volatile methanol soluble by-product substances of the polymerization reaction. The solid body of polymeric product is usually crushed or broken to granular form, prior to separating volatile ingredients from the copolymer.

The copolymer is recovered from the polymeric product in purified form by vaporizing unreacted monomers therefrom in vacuum, together with other volatile ingredients, e. g. dimers or trimers of the monomeric starting materials.

The copolymer is usually purified, or devolatilized, by feeding the polymeric product as a solution of the copolymer in monomers, or as a heat-plastified body, into and from a zone of reduced pressure, e. g. a vacuum chamber, wherein the volatile ingredients are vaporized by heating the copolymer to a temperature between about 200° and 280° C., preferably between 240° and 280° C., at an absolute pressure of less than 50 millimeters of Hg, preferably 25 millimeters, or less. The copolymers should not be heated at the devolatilizing temperatures for a time sufficient to cause decomposition of the same with formation of the non-volatile methanol soluble substances hereinbefore mentioned. In general, the copolymers may be heated in vacuum to temperatures between 240° and 280° C., for a period of about 2 hours without the formation of more than a minor and inconsequential amount, i. e. less than 0.5 per cent by weight, of non-volatile methanol soluble substances, but the copolymers are usually heated to such temperatures during devolatilization of the same for a time of not greater than 60 minutes, preferably for a time of 30 minutes, or less, to reduce the tendency toward deterioration of the copolymer. At lower temperatures, e. g. at a temperature of 200° C., the copolymer can be heated in vacuum for a time of 24 hours, or longer, without deteriorating, although such prolonged heating of the copolymer to devolatilize the same is not usually required. The time of heating the copolymer while devolatilizing the same can be regulated by controlling the rate of flow of copolymer into and from the zone of reduced pressure.

The polymeric product is preferably mechanically agitated, or worked, in vacuum by a kneading or stirring action, so as to provide a large surface of the copolymer compared to volume, for escape of the volatile ingredients therefrom. Such kneading or stirring action also permits heat to more readily be supplied to the copolymer through surfaces in contact therewith, to maintain it in a fluid condition and also to replace the heat lost due to vaporization of the volatile ingredients. The volatile ingredients may be separated from the copolymer by contacting the polymeric product with surfaces of one or more heated rolls during passage through a zone of reduced pressure. The roll or rolls should be adapted for continuously forwarding and discharge of the copolymer product by extrusion, or otherwise. Vapors of the volatile ingredients are separately withdrawn from the zone of reduced pressure. An apparatus suitable for separating unreacted monomers, together with other volatile ingredients from the copolymers, is described in U. S. Patent 2,488,189.

The solid polymeric product may also be devolatilized by rapidly heating the same, preferably in granular form, to a temperature between 240° and 280° C. and feeding the seat-fluidized copolymer into and from a vacuum chamber wherein it is caused to flow as one or more thin streams, bands, or ribbons, out of contact with inner walls of said chamber, through a zone maintained at an absolute pressure of 25 millimeters of Hg, or less, to rapidly vaporize the volatile ingredients from the copolymer. In this connection, it may be mentioned that a stream, band, or ribbon, such as is formed by passing a flow of the heated copolymer into the upper portion of a vacuum chamber through a die plate containing one or more constricted passageways, e. g. drill holes or slots, having a diameter, or width, respectively, of ¼ inch, or less, is satisfactory. The shape of the passageways is immaterial, provided the melted copolymer is formed into streams which have a large surface compared to volume. In general, circular perforations, or drill holes having a diameter of ⅛ to ¼ inch are preferred. Slots having a width of 1/16 to ¼ inch represent about the range which can be used practically. The stream, band, or ribbon, of heated copolymer formed by passing the melted polymeric product through a die plate into a vacuum chamber is permitted to flow, or fall, therein for a material distance, e. g. for a distance of from 2 to 6 feet or more, out of contact with inner walls of said chamber so as to expose the heated copolymer to vacuum for a time sufficient to vaporize the volatile ingredients and leave a copolymer residue, or product, containing less than 1 per cent by weight of methanol soluble substances.

Other ways of separating the volatile ingredients from the copolymer product will be apparent to those skilled in the art. However, in all such devolatilizing procedures the copolymer should not be heated at temperatures above its melting point for periods of time sufficient to cause the formation of decomposition products which lower the heat distortion temperature of the copolymer.

The copolymers of the invention are normally solid polymeric products which may be dissolved to form 10 weight per cent solutions in toluene having absolute viscosities of 18 centipoises, or greater, at 25° C. The copolymers can be molded by conventional methods in compression molding, or injection molding apparatus, to form articles having dimensional stability to heat superior to articles made from polystyrene of similar molecular weight. The copolymers contain less than 1 per cent by weight of methanol soluble substances. They may be molded to form transparent colorless articles having excellent electrical properties, and good tensile and impact strength.

The following examples illustrate ways in which the principle of the invention has been applied, but are not to be construed as limiting the invention.

EXAMPLE 1

In each of a series of experiments, a mixture of styrene and alpha-methyl styrene in the proportions indicated in the following table, together with 0.01 per cent of di-tertiary-butyl peroxide as polymerization catalyst, was polymerized by heating the same in a closed container in accordance with the schedule of time and temperature conditions stated in the table. The polymeric product was removed from the container and heated to a temperature of 190° C., at an absolute pressure of from 1–2 millimeters of Hg, over a period of 2 hours to remove volatile ingredients. Thereafter, the copolymer from each of the experiments was cooled to room temperature and the solid resin crushed to form granules of a size suitable for molding. A portion of each of the copolymers was injection molded to form test bars of ⅛ by ⅛ inch square cross section. The test bars were used to determine the tensile strength in pounds per square inch of initial cross section and the impact strength of each product in inch-pounds of energy, applied as a sharp blow to cause breakage of a test bar. Except for the shape and dimensions of the test bars and the weight of the hammer used in measuring impact strength, the procedures in determining tensile strength and impact strength were similar to those described in A. S. T. M. D638–44T and A. S. T. M. D256–43T, respectively. Other molded pieces were used to determine the heat distortion temperatures by a procedure of Heirholzer and Boyer, A. S. T. M. Bulletin No. 134 of May 1945. Other portions of each copolymer were tested to determine the proportion of residual volatile material therein, the proportion of methanol soluble substances therein, and a viscosity characteristic of the copolymer. The procedure in determining the proportion of residual volatile material was to weigh a portion of the granular copolymer, then heat it to a temperature of 216° C. at an absolute pressure of 0.05 millimeter of Hg over a period of 30 minutes and cool and re-weigh. The loss in weight represents volatile ingredients. The procedure to determine the proportion of methanol soluble material was to dissolve a weighed amount of the copolymer in dioxane, precipitate the polymer in methanol, separate and dry the precipitated polymer and determine its weight. The loss in weight represents methanol soluble material. It should be noted that the per cent methanol soluble material also includes the residual volatile materials. The viscosity characteristic was determined by dissolving a portion of the copolymer in toluene to form a solution containing 10 per cent by weight of said product and determining the absolute viscosity in centipoises at 25° C., of the solution. Table I identifies each copolymer by giving the per cent by weight of styrene and alpha-methyl styrene in the mixture polymerized, the conditions of time and temperature at which the polymerization was carried out, the per cent methanol soluble material in the copolymer and the viscosity characteristic. The table also gives the properties determined for each product. For purpose of comparison copolymers prepared under polymerizing conditions outside the scope of the invention are also included in the table.

*Table I*

| Run No. | Percent Alpha-Methyl Styrene | Percent Styrene | Polymerization Schedule | | Percent Polymerization | Percent Volatile | Percent CH₃OH Soluble | Viscosity, cps. | Heat Distortion Temp., °C. | Impact Strength, inch-lbs. | Tensile Strength, lbs./sq. in. |
|---|---|---|---|---|---|---|---|---|---|---|---|
| | | | Time, days | Temp., °C. | | | | | | | |
| 1 | 15 | 85 | 20 | 102 | 99.1 | 0.20 | 0.98 | 59.4 | 89 | 1.4 | 9,660 |
| 2 | 15 | 85 | 10 | 110 | 98.8 | 0.40 | 0.89 | 42.1 | 90 | 1.5 | 8,760 |
| 3 | 15 | 85 | 6 | 120 | 98.8 | 0.26 | 0.93 | 25.2 | 91 | 1.3 | 8,690 |
| 4 | 15 | 85 | 3 | 130 | 98.8 | 0.23 | 0.92 | 18.1 | 88 | 0.9 | 8,420 |
| 5 | 25 | 75 | 20 | 102 | 98.0 | 0.08 | 0.72 | 36.2 | 97 | 1.0 | 9,380 |
| 6 | 25 | 75 | 10 | 110 | 97.7 | 0.30 | 0.67 | 30.1 | 96 | 0.9 | 9,540 |
| 7 | 25 | 75 | 6 | 120 | 97.5 | 0.27 | 0.82 | 18.5 | 93 | 0.7 | 8,150 |
| 8 | 25 | 75 | 3 | 130 | 96.7 | 0.19 | 1.27 | 13.1 | 88 | 0.6 | 7,630 |
| 9 | 50 | 50 | 20 | 102 | 85.1 | 0.20 | 0.79 | 19.2 | 107 | 0.7 | 8,650 |
| 10 | 50 | 50 | 10 | 110 | 81.2 | 0.25 | 1.15 | 12.3 | 101 | 0.7 | 7,620 |
| 11 | 50 | 50 | 6 | 120 | 80.5 | 0.49 | 2.16 | 9.7 | 101 | 0.5 | 7,260 |
| 12 | 50 | 50 | 3 | 130 | 78.5 | 0.65 | 2.70 | 7.8 | 98 | 0.5 | 4,650 |

In runs 8 and 10-12 inclusive, it will be noted that the copolymers containing more than 1 per cent of methanol soluble substances and having viscosities less than 13 centipoises at 25° C., show a substantial lowering of the heat distortion temperature as well as a large decrease in the tensile strength, as compared to the copolymers within the scope of the invention.

EXAMPLE 2

In each of a series of experiments, a mixture of styrene and alpha-methyl styrene in the proportions indicated in the following table, was polymerized by heating the same in a closed container in accordance with the schedule of time and temperature conditions stated in the table. Each mixture was polymerized under conditions such as to obtain copolymers having approximately the same average molecular weight as determined by the viscosity characteristic of a 10 weight per cent solution of the copolymer in toluene at 25° C. The polymeric product was removed from the container and heated in vacuum to a temperature of 190° C., at an absolute pressure of from 1-2 millimeters of Hg, over a period of 2 hours to separate volatile ingredients. The copolymers were then cooled and crushed to a size suitable for molding. Thereafter, the viscosity characteristic, the per cent volatile, and the per cent methanol soluble material of the copolymers and also the impact strength and the heat distortion temperature of test bars molded from the same, were determined as in Example 1. Table II identifies each polymer by naming the monomeric materials from which it was prepared and gives the properties determined for each product. For comparison, styrene and a copolymer outside the scope of the invention are included in the table as runs 1 and 8, respectively.

The solid granular polymeric product was fed at a rate of 400 pounds per hour into a screw feeder wherein it was melted and rapidly heated to a temperature of 275° C. The fluid polymeric product was caused to flow by pressure from the screw feeder via a jacketed and heated conduit through a distributor head 24 inches in diameter having approximately 2,000 perforations, consisting of ¼ inch drill holes on ¾ inch centers, into the top of a jacketed vessel 9 feet high having an internal diameter of 27 inches, wherein the thin streams of hot resinous material were permitted to flow freely out of contact with inner walls of the vessel throughout a greater part of the interior length of the vessel while being subjected to high vacuum, i. e. an absolute pressure of from 3-4 millimeters of Hg, to vaporize volatile ingredients from the copolymer. Vapors of the volatile ingredients were removed from the vacuum chamber via an outlet in the upper portion thereof, connected to a condenser and a vacuum pump. The streams of devolatilized polymeric product coalesced, or flowed together, to form a viscous fluid mass of the purified copolymer product within a lower portion of the vessel. The devolatilized copolymer was removed from the vacuum chamber by means of a plastic gear pump connected to an opening in the bottom of the vessel. The pump also served as a valve or seal so that the copolymer could be withdrawn intermittently, or in continuous manner, from the vessel. The devolatilized copolymer was fed at a temperature of about 265° C., via a conduit, from the pump, onto water cooled rolls and was compressed therebetween into a thin sheet and rapidly cooled to a temperature of approximately 60° C., then ground to form a granular powder. The inventory time, i. e. the time interval between feeding an infinitesimal portion of the solid granular polymerization

*Table II*

| Run No. | Percent Styrene | Percent Alpha-methyl Styrene | Polymerization Schedule | | Percent Polymerization | Percent Volatile | Percent CH₂OH Soluble | Viscosity, cps. | Heat Distortion Temp., °C. | Impact Strength, in.-lbs. |
|---|---|---|---|---|---|---|---|---|---|---|
| | | | Time | Temp., °C. | | | | | | |
| 1 | 100 | 0 | 4 hrs. | 130 | 77 | 0.33 | | 50 | 85 | 1.0 |
| 2 | 90 | 10 | 15 hrs. | 120 | 87 | 0.29 | | 44 | 89 | 0.9 |
| 3 | 80 | 20 | 35 hrs. | 111 | 73 | 0.46 | | 42 | 95 | 1.1 |
| 4 | 70 | 30 | 4 days | 102 | 75 | 0.33 | | 47 | 97 | 1.4 |
| 5 | 60 | 40 | 10.5 days | 93 | 70 | 0.43 | | 49 | 101 | 1.2 |
| 6 | 50 | 50 | 25 days | 83 | 54 | 0.40 | | 48 | 104 | 1.2 |
| 7 | 75 | 25 | 4 days | 102 | 59 | 0.49 | 0.60 | 45 | 94 | |
| 8 | 75 | 25 | 4 days / 2 days / 2 days | 102 / 110 / 240 | 98 | 0.85 | 4.13 | 49 | 86 | |

EXAMPLE 3

A mixture consisting of 17,250 pounds of styrene and 5,750 pounds of alpha-methyl styrene, together with 2.3 pounds of di-tertiary-butyl peroxide as polymerization catalyst, was sealed in a number of closed sheet metal containers, each containing approximately 90 pounds of the mixture. The mixture was polymerized by submerging the containers in a liquid bath and heating the latter according to the following schedule of time and temperature conditions: 2 days at a temperature of 88° C.; 2 days at 83° C.; 3 days at 80° C.; 3 days at 84° C.; 1 day at 87° C.; 2 days at 90° C.; 2 days at 95° C.; and 2 days at 150° C. Thereafter, the containers were removed from the bath, cooled to room temperature and the polymeric product removed from the container and crushed to a granular form. product into the screw feeder and cooling the infinitesimal portion of the devolatilized copolymer on the rolls, was about 8 minutes. Samples of the devolatilized granular copolymer were withdrawn at intervals and the properties determined as in Example 1. The copolymer was found to have a heat distortion temperature of 98° C., and contained 0.8 per cent by weight of methanol soluble substances. A solution consisting of 10 weight per cent of the copolymer in toluene had an absolute viscosity of 45 centipoises at 25° C.

EXAMPLE 4

A mixture consisting of 20 per cent by weight alpha-methyl styrene and 80 per cent styrene was fed in continuous manner into a jacketed vessel equipped with valved inlets, a steam coil and a stirrer, wherein the mixture was polymerized by heating the same to a temperature of 105° C., while stirring, until a solution containing about 50 per cent by weight of copolymer was obtained. Thereafter, the mixture of monomers was fed into the vessel at a rate of 12 pounds per hour while a solution containing approximately 50 per cent by weight of copolymer was withdrawn from a lower portion of the vessel at a rate corresponding to the rate of feed thereto. The solution of copolymer in monomers was fed by means of a plastic gear pump into a zone maintained at an absolute pressure of 25 millimeters of Hg, wherein the solution of copolymer was contacted with heated surfaces of a roll, adapted for continuously forwarding and discharge of the copolymer by extrusion by rotating adjacent to heated walls of a complementary casing with suitable clearance for flow of the plastic therebetween and escape of the vaporized volatile ingredients to a chamber connected to a vacuum pump. Sufficient heat was supplied to the copolymer through surfaces in contact therewith, to vaporize the volatile ingredients and maintain the copolymer in a fluid condition. The copolymer was extruded from the zone of reduced pressure at a temperature of 235° C., through a constricted passageway at a rate of about 6 pounds per hour and was drawn away and cooled to a solid form. The inventory time was approximately 60 minutes. Properties of the copolymer were determined as in Example 1. The copolymer had a heat distortion temperature of 91° C. and contained 1.09 per cent by weight of methanol soluble substances. A solution consisting of 10 weight per cent of the copolymer in toluene had an absolute viscosity of 35 centipoises at 25° C.

EXAMPLE 5

A purpose of this experiment is to illustrate the tendency toward the formation of non-volatile methanol soluble substances and deterioration of the copolymer by heating the same to a temperature above its melting point for prolonged periods of time. A solid polymeric product, prepared by polymerizing a mixture consisting of 25 per cent by weight of alpha-methyl styrene and 75 per cent of styrene in bulk in the presence of 0.01 per cent of ditertiary-butyl peroxide as polymerization catalyst, was devolatilized in the following manner. The granular polymeric product was fed at an average rate of about 7 pounds per hour into a heated screw feeder wherein it was rapidly brought to a temperature of 270° C. The fluid polymeric product was caused to flow by pressure from the screw feeder via a jacketed and heated conduit through a distributor head 3 inches in diameter having 7 perforations consisting of ¼ inch drill holes on 1 inch centers, into the top of a jacketed and heated vessel 42 inches high having an internal diameter of 6 inches. The thin streams of hot resinous material were permitted to flow freely out of contact with inner walls of the vessel for a distance of about 36 inches into a lower portion of the vessel while maintaining an absolute pressure of 3 millimeters of Hg therein. Vapors of volatile ingredients were removed from the vessel through an outlet in an upper portion thereof connected to a condenser and vacuum pump. The streams of devolatilized copolymer coalesced, or flowed together, to form a viscous fluid mass of the same within a lower portion of the vessel. The fluid copolymer was withdrawn from the vacuum chamber by means of a plastic gear pump connected to an outlet in the bottom of the vessel and was rapidly cooled to a solid form. The pump also served as a seal so that the copolymer could be withdrawn intermittently, or in continuous manner, from the vacuum chamber. The inventory time, i. e. the time interval for an infinitesimal portion of the granular polymerization product fed into the screw feeder to traverse the system and be cooled to a solid, was approximately 10 minutes when the copolymer was withdrawn from the vacuum chamber at a rate substantially the same as the rate of feed thereto, which rate was about 7 pounds per hour. In an experiment to determine the effect of prolonged heating at high temperatures on the devolatilized copolymer, a body of the devolatilized product was allowed to accumulate in the vacuum chamber over a period of 2 hours, where it was maintained at a temperature of about 270° C. Thereafter, the feed was stopped and the chamber filled with nitrogen gas at a pressure of 10 pounds per square inch, gauge. After storing for a time of 1 hour under nitrogen, approximately one-third of the copolymer was withdrawn, rapidly cooled to a solid and crushed to a granular form. The remaining copolymer was withdrawn from the vacuum chamber in two portions after storing under nitrogen at a temperature of 270° C. for 6 hours, and 16 hours, respectively. The viscosity characteristic, the per cent volatile, and the per cent methanol soluble of the different portions of copolymer and also the heat distortion temperature of test bars molded from the same, were determined as in Example 1. Table III identifies each portion of the copolymer by stating the total time for which it was heated and also gives the properties determined for each product.

*Table III*

| Run No. | Time of Heating | Temp., °C. | Viscosity, cps. | Heat Distortion Temp., °C. | Percent CH₃OH Soluble | Percent Volatile |
|---|---|---|---|---|---|---|
| 1 | 10 min | 270 | 66 | 96 | 1.46 | 0.31 |
| 2 | 3 hrs | 270 | 50 | 96 | 1.70 | 0.43 |
| 3 | 8 hrs | 270 | 48 | 89 | 3.10 | 1.07 |
| 4 | 18 hrs | 270 | 37 | 87 | 4.03 | 1.43 |

Other modes of applying the principle of the invention may be employed instead of those explained, change being made as regards the compounds or steps herein employed, provided the compounds or steps stated in any of the following claims, or the equivalent of such compounds or steps, be employed.

We claim:

1. A process for making a copolymer of styrene and alpha-methyl styrene which comprises heating a mixture consisting of from 10 to 50 per cent by weight of alpha-methyl styrene and from 90 to 50 per cent of styrene in bulk to a polymerization temperature not greater than that defined by the equation:

$$t = 147 - 0.78x$$

wherein $t$ represents temperature in degrees centigrade and $x$ is the per cent by weight of alpha-methyl styrene in the polymerizable starting materials, until a viscous solution of copolymer in monomers is obtained, the said copolymer having an average molecular weight such that a 10 weight per cent solution of the same in toluene has an absolute viscosity of at least 18 centipoises at 25° C., feeding the solution into a zone of reduced pressure wherein the copolymer is heated to a temperature between 240° and 280° C. at an absolute pressure of less than 50 millimeters for a time not greater than 60 minutes while vaporizing volatile ingredients therefrom to leave a copolymer residue containing less than 1 per cent of methanol soluble substances, separately withdrawing vapors of the volatile ingredients and the heat-plastified copolymer from the zone of reduced pressure and cooling the copolymer.

2. A process for making a copolymer of styrene and alpha-methyl styrene which comprises heating a mixture consisting of from 10 to 50 per cent by weight of alpha-methyl styrene and from 90 to 50 per cent of styrene in bulk to a polymerization temperature between 70° C. and a temperature defined by the equation:

$$t = 147 - 0.78x$$

wherein $t$ represents temperature in degrees centigrade and $x$ is the per cent by weight of alpha-methyl styrene in the polymerizable starting materials, until a solution containing from 50 to 80 per cent of copolymer in monomers is obtained, the said copolymer having an average molecular weight such that a 10 weight per cent solution of the same in toluene has an absolute viscosity of at least 18 centipoises at 25° C., feeding the solution into a zone of reduced pressure wherein it is agitated and the copolymer is heated to a temperature between 240° and 280° C. at an absolute pressure of less than 25 millimeters for a time of less than 30 minutes while vaporizing volatile ingredients therefrom by contacting the copolymer with heated surfaces to leave a copolymer residue containing less than 1 per cent of methanol soluble substances, separately withdrawing vapors of the volatile ingredients and the heat-plastified copolymer from the zone of reduced pressure and cooling the copolymer.

3. A process for making a copolymer of styrene and alpha-methyl styrene which comprises polymerizing a mixture consisting of from 10 to 50 per cent by weight of alpha-methyl styrene and from 90 to 50 per cent of styrene by heating the mixture of monomers in bulk to a temperature between 70° C. and a temperature defined by the equation:

$$t = 147 - 0.78x$$

wherein $t$ represents temperature in degrees centigrade and $x$ is the per cent by weight of alpha-methyl styrene in the polymerizable starting materials, until a solution containing from 50 to 80 per cent by weight of copolymer is obtained, the said copolymer having an average molecular weight such that a 10 weight per cent solution of the same in toluene has an absolute viscosity of at least 18 centipoises at 25° C., feeding the solution into contact with heated surfaces adapted for continuously forwarding and discharge of the copolymer by extrusion through a zone maintained at an absolute pressure of less than 25 millimeters, wherein it is heated to a temperature between 240° and 280° C. for a time of less than 30 minutes while vaporizing volatile ingredients therefrom to leave a copolymer residue containing less than 1 per cent of methanol soluble substances, separately withdrawing vapors of the volatile ingredients and the copolymer from the zone of reduced pressure and cooling the copolymer.

4. In a method of making a copolymer of styrene and alpha-methyl styrene, which copolymer is substantially free from non-volatile methanol soluble substances, by polymerization of a mixture consisting of from 10 to 50 per cent by weight of alpha-methyl styrene and from 90 to 50 per cent of styrene by heating the same in bulk until a solution containing from 50 to 80 per cent of the copolymer is obtained, the said copolymer having an average molecular weight such that a 10 weight per cent solution of the same in toluene has an absolute viscosity of at least 18 centipoises at 25° C.; the steps of feeding the solution into a zone of reduced pressure wherein the copolymer is heated to a temperature between 240° and 280° C. at an absolute pressure of less than 50 millimeters for a period of time not exceeding 60 minutes while vaporizing volatile ingredients therefrom to leave a copolymer residue containing less than one per cent by weight of methanol soluble substances, separately withdrawing vapors of the volatile ingredients and the heat-plastified copolymer from the zone of reduced pressure and cooling the copolymer.

JAMES L. AMOS.
CARROLL T. MILLER.

References Cited in the file of this patent

UNITED STATES PATENTS

| Number | Name | Date |
|---|---|---|
| 2,273,822 | Allen | Feb. 24, 1942 |
| 2,302,464 | Palmer | Nov. 17, 1942 |
| 2,496,653 | Allen | Feb. 7, 1950 |

FOREIGN PATENTS

| Number | Country | Date |
|---|---|---|
| 443,405 | Great Britain | Feb. 27, 1936 |